United States Patent [19]

Mills et al.

[11] Patent Number: 4,712,823

[45] Date of Patent: Dec. 15, 1987

[54] CUP HOLDER APPARATUS

[75] Inventors: Ronald E. Mills, Birmingham; Peter J. Perry, South Lyon, both of Mich.

[73] Assignee: Chrysler Motors Corporation, Highland Park, Mich.

[21] Appl. No.: 859,966

[22] Filed: May 5, 1986

[51] Int. Cl.⁴ .............................................. B60R 7/04
[52] U.S. Cl. ................................. 296/37.8; 296/152
[58] Field of Search .................. 296/37.8, 37.9, 37.13, 296/37.12, 152; 224/42.42, 273, 311; 108/45; D3/45; 220/23

[56] References Cited

U.S. PATENT DOCUMENTS 1,708,895  4/1929  Phillips ................................. 108/45
2,825,611  3/1958  Aynesworth ........................ 108/45

Primary Examiner—Robert B. Reeves
Assistant Examiner—Carol L. Olson
Attorney, Agent, or Firm—Gerald P. Dundas

[57] ABSTRACT

A cup holder for employment within the passenger area of a vehicle. The cup holder is built into a vehicle trim structure such as a door trim panel so as to be incorporated as an integral part of the vehicle's interior and minimize bulk, attachment and support requirements. The cup holder comprises two plate members having edges which are connected to each other by a hinge, and opposite edges which are movably connected to a housing carried in the trim panel. One plate covers a access opening to the housing in the trim panel and movement thereof carries the second plate from a stowed position behind and parallel with the first plane to a cup supporting position in which the second plate projects horizontally from the trim panel.

1 Claim, 3 Drawing Figures

CUP HOLDER APPARATUS

BACKGROUND OF THE INVENTION

1. Field of the Invention

A vehicle accessory which is becoming unusually popular is a beverage bottle, or can support, which is readily accessible and which will retain the container in a secure fashion to avoid spillage due to vehicle motion. This type of accessory is commonly referred to as a cup holder. This invention relates to a cup holder which is formed as an integral component of a vehicle interior trim panel so as to minimize space requirements and be aesthetically compatible with the vehicle interior.

2. Brief Description of the Prior Art

Accessory supports such as cup holders are well known but are presently found in the form of add-on housings as opposed to an integral part of the vehicle interior. Such presently available devices are bulky and detract from the appearance of the vehicle interior. U.S. Pat. Nos. 3,136,461 and 3,267,567 are representative of such add-on units, and disclose devices which are visually unpleasing and require careful alignment in assembly within the vehicle to insure proper fit. Since they are separate, i.e., not built into the vehicle interior, the devices require individual fasteners, part numbers and strong vehicle support attachment such as floor pan tunnel support.

SUMMARY OF THE INVENTION

An integrated body interior trim panel is provided having means for supporting one or more beverage containers. The cup holder is constructed to minimize space and weight requirement, present a pleasing "built-in" appearance in contrast to an "add-on", and yet provide more than adequate means to securely restrain the container from accidental spillage.

The cup holder of this invention is provided by providing a recess or opening in the trim panel by which to accommodate a housing which supports two panel members. One of the panel members is pivotally hinged adjacent its lower edge to a lower portion of the housing and is movable between a cup holder stowed position in which the panel lies substantially flush with the surrounding trim panel to an open position in which the panel pivots outwardly from the trim panel. The first panel is dimensioned to substantially close the trim panel opening when the cup holder is in its stowed position and can be provided with an ornamental or decorative finish to complement the remaining interior trim members. Pivotally joined to this first panel is a second panel with the two panels being interconnected by means of a hinge adjacent the top of both the first and second panels. The lower portion of the second panel is provided with guide rollers which are received in slots formed in the vertical walls of the housing. In operation, normal movement of the first panel causes the second panel to move from a stowed position in which it is behind and parallel to said first panel to an open or cup supporting position in which the said panel projects generally horizontal and outward from the trim panel.

DETAILED DESCRIPTION OF THE INVENTION

Figures 1, 2, 3:
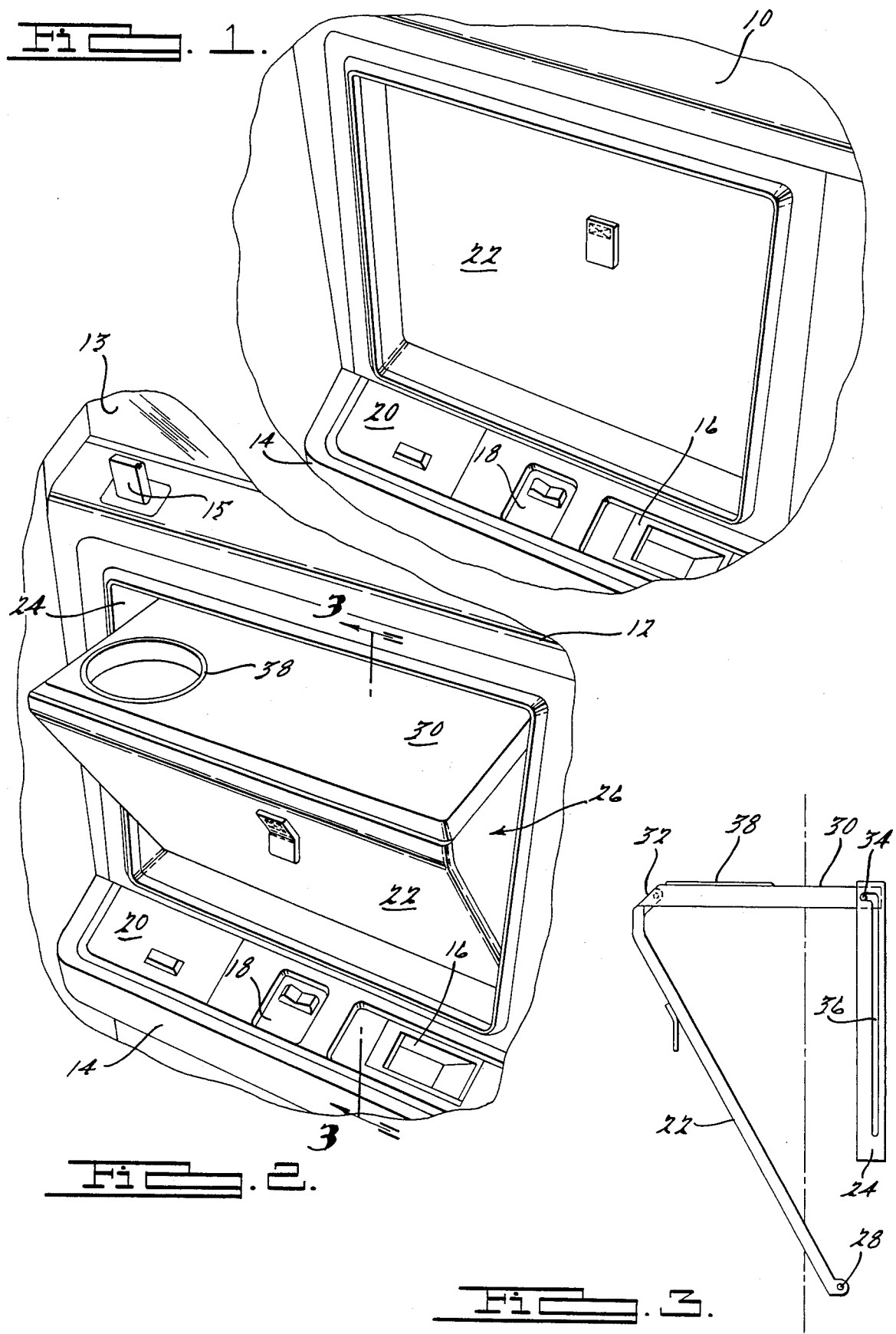
FIG. 1 is a perspective view of the cup holder of this invention integrated with a vehicle interior rear door trim panel.
FIG. 2 illustrates the cup holder arrangement shown in FIG. 1 in an open or extended position.
FIG. 3 is a sectioned view taken along the line 3—3 of FIG. 1.

The cup holder assembly of this invention is illustrated in the drawing in conjunction with a vehicle interior rear door trim panel application. The trim panel, indicated generally by 10, is shown attached to a vehicle door 12 having a window 13 and garnish molding latch lock control 15, and the trim panel is shaped to provide an arm rest 14 which houses a door and window controls 16, 18 and ash tray 20.

The cup holder of this invention is constructed as an integral part of the interior trim panel whose particular configuration is not critical to the invention. In the illustrated embodiment, the cup holder comprises a first panel or cover member 22 which is movably supported in a compartment or housing 24 having an access opening 26 in the trim panel 10. As shown, the cover member 22 is pivotally supported relative to the trim panel about a horizontal pivot axis 28 forward on the housing 24 adjacent the lower edge of the access opening such that it may pivot from a stowed position where it is substantially flush with the surrounding wall of the trim panel (FIG. 1) to an open position (FIG. 2) where the cover member 22 extends outwardly form the trim panel 10. A second panel or shelf 30 is hinged 32 adjacent its upper edge to the top of the first part of cover 22 and has guide rollers 34 (FIG. 3) positioned at its lower sides which are received within slots 36 formed in the walls of the housing 24. Closing of cover 22 results in shelf 30 actuating inwardly and downwardly in the slots 36 to lie behind and parallel to the cover 22.

Shelf 30 is provided with a recess 38 whose sides are dimensioned to supportingly receive a beverage can or cup member. It will be understood that a container supporting aperture extending through shelf 30 could be employed in place of recess 38.

While the present invention has been described in connection with the preferred embodiment thereof, it should be understood that there may be other embodiments which fall within the spirit and scope of the invention and that the invention is susceptible to modification and variation without departing from the following claims.

What is claimed is:

1. In combination with a vehicle body panel having an access opening, a cup holder apparatus mounted in said access opening and movable between a stowed position generally parallel with said panel and an extended position projecting outside said compartment access opening, said cup holder apparatus comprising a housing having a frame surrounding said access opening and opposite generally vertically extending side walls positioned to extend to one side of said vehicle body panel, a cover member pivotally supported on a horizontal axis adjacent a lower edge of said housing, said cover member substantially closing said access opening when the cup holder is in stowed position, a shelf member having a first edge hingedly mounted adjacent an upper edge of said cover member, said shelf being movably supported within slots provided in said vertical walls of said cup holder housing such that said shelf is within said housing and generally parallel with said vehicle body panel when the cup holder apparatus is in the stowed position, and generally in a horizontal position projecting outwardly from said vehicle body panel in the extended position of said cup holder apparatus.

* * * * *